United States Patent [19]

Borenstein et al.

[11] Patent Number: 5,239,515
[45] Date of Patent: Aug. 24, 1993

[54] ERROR-ELIMINATING RAPID ULTRASONIC FIRING

[75] Inventors: Johann Borenstein; Yoram Koren, both of Ann Arbor, Mich.

[73] Assignee: University of Michigan, Ann Arbor, Mich.

[21] Appl. No.: 798,094

[22] Filed: Nov. 26, 1991

[51] Int. Cl.$^5$ .................................................. G01S 15/00
[52] U.S. Cl. .......................................... 367/87; 367/95; 367/105; 367/140; 364/424.01; 901/46
[58] Field of Search .......................... 364/424.01, 424.1; 367/87, 93, 94-98, 105, 117, 129; 395/90, 93; 901/46

[56] References Cited

U.S. PATENT DOCUMENTS 4,896,304  1/1990  Tanigawa ............................ 367/103
4,920,520  4/1990  Göbel et al. ........................... 367/99
4,967,860  11/1990  Kremser ........................... 367/909 X Primary Examiner—J. Woodrow Eldred
Attorney, Agent, or Firm—Rohm & Monsanto

[57] ABSTRACT

A system for producing reliable navigation data for a mobile vehicle, such as a robot, combines multiple range samples to increase the "confidence" of the algorithm in the existence of an obstacle. At higher vehicle speed, it is crucial to sample each sensor quickly and repeatedly to gather multiple samples in time to avoid a collision. Erroneous data is rejected by delaying the issuance of an ultrasonic energy pulse by a predetermined wait-period, which may be different during alternate ultrasonic firing cycles. Consecutive readings are compared, and the corresponding data is rejected if the readings differ by more than a predetermined amount. The rejection rate for the data is monitored and the operating speed of the navigation system is reduced if the data rejection rate is increased. This is useful to distinguish and eliminate noise from the data which truly represents the existence of an article in the field of operation of the vehicle.

13 Claims, 8 Drawing Sheets

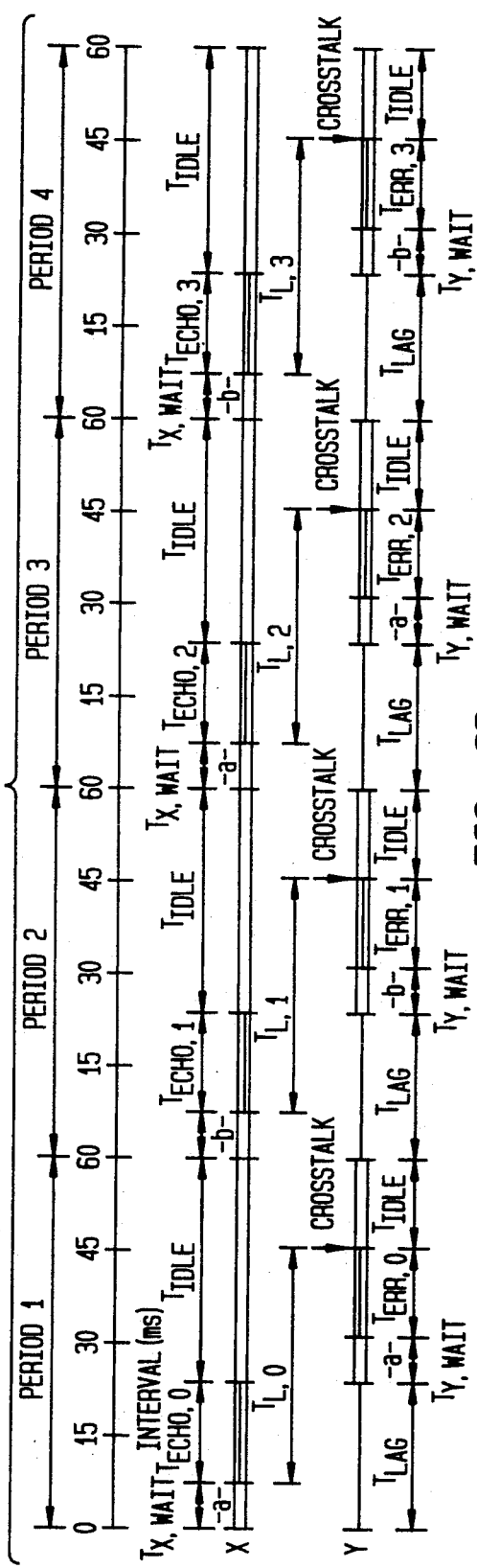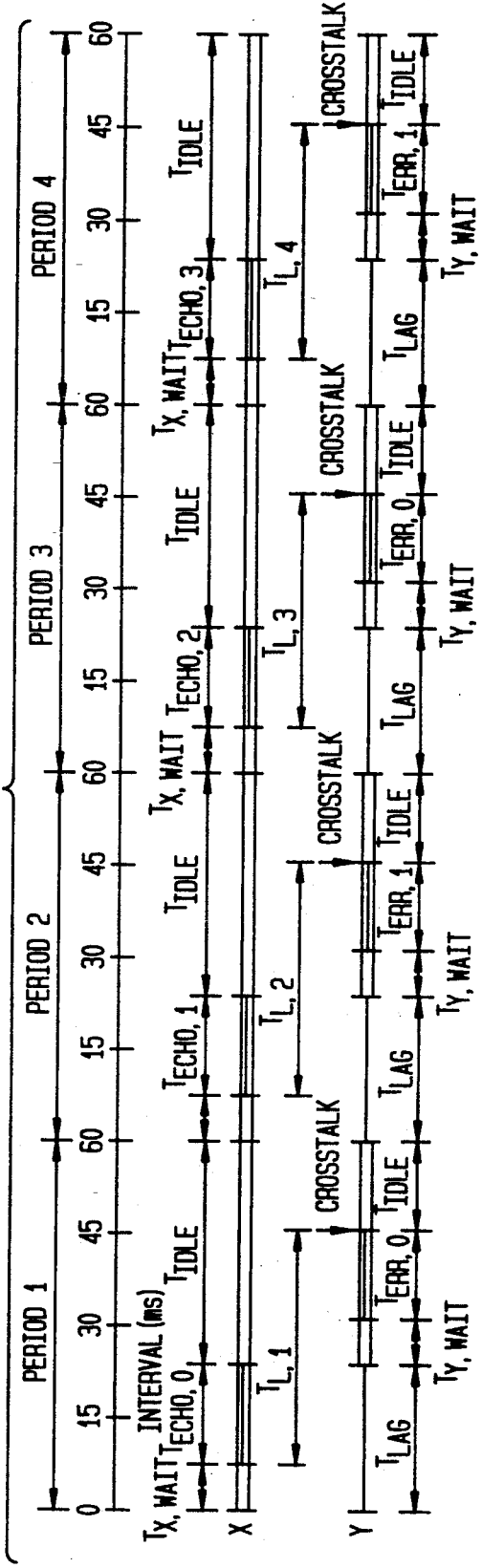

ERROR-ELIMINATING RAPID ULTRASONIC FIRING

GOVERNMENT RIGHTS

This invention was made under contract awarded by the Department of Energy, Account Number DE-FG02-86NE37969. The government has certain rights in the invention.

BACKGROUND OF THE INVENTION

This invention relates generally to ultrasonic navigation systems, and more particularly, to a robotic control system which employs an array of rapid-firing ultrasonic transducers and fires same in accordance with a firing scheme which eliminates crosstalk interference between the ultrasonic transducers.

In order to detect obstacles and navigate around them, many mobile robots use multiple ultrasonic transducers or sensors. Typical configurations are comprised of 12, 16, 24, or even more sensors, which usually are installed along the periphery of the vehicle. It is well-known as a serious problem that ultrasonic sensors, particularly as they have heretofore been used in robotic navigation systems, are subject to noise and sporadic false readings. Ultrasonic sensors are additionally subject to the problems which plague any other sensor system.

An ultrasonic range sensor (URS) is comprised of a transducer with associated support electronics. The transducer used in the vast majority of all obstacle avoidance applications for mobile robots is manufactured by POLAROID CORPORATION, 119 Windsor Street, Cambridge, Mass. 02139, and was originally designed for automatic focusing of the POLAROID SX-70 camera. The transducer comprises of an ultrathin gold-plated membrane about 1.5" in diameter that can be used to either transmit or receive ultrasonic sound waves. With commercially available support electronics from TEXAS INSTRUMENTS, P.O. Box 225012, Dallas, Tex. 75265 (marketed by MICROMINT, INC, 4 Park Street, Vernon, Conn. 06066), the sensor has a maximum range of 10 m and a resolution of 3 cm. When triggered ("fired"), the known transducer system issues 16 pulses of ultrasound at 50 KHz, for the duration of 0.32 ms. The sound waves travel at a speed of 340 m/sec at room temperature. Objects located within a cone-shaped volume (the active cone) in front of the sensor reflect some of the incident sound energy back to the sensor. Shortly after firing, the ultrasonic sensor enters a receiving state and awaits the echo. When the echo reaches the sensor membrane, the resulting weak signal is amplified and thresholded. The time between firing the sensor and receiving the echo is called time-of-flight (TOF) and is directly proportional to the distance to the reflecting object. For example, if an object is 1 m ahead of the sensor, the corresponding TOF=1×2/340=5.9 ms.

The URS from TEXAS INSTRUMENTS is designed with an automatically increasing gain in the receiver circuit. This feature increases the gain approximately exponentially, as a function of the TOF. The variable gain is necessary to compensate for the exponential attenuation of the ultra-sound energy over distance. Note that the URS may interpret any ambient ultrasonic noise of sufficient amplitude as an echo, and thus produce an arbitrary, false range reading. Any firing algorithm can limit the time it is waiting for an echo. This measure reduces the maximum range of the sensor but increases the sampling rate. The time a URS is "open" to await an echo is termed the time window, $T_{wind}$.

In most environments where a robotic system is required to operate, environmental ultrasonic noise is fairly rare. However, such is not the case in many manufacturing environments where hydraulic, pneumatic, and other systems which may be in use produce sufficient ultrasonic noise to render the sensors inoperable, even for short periods of time. Moreover, robots with multiple ultrasonic sensors may introduce their own noise, a phenomenon known as "crosstalk". Crosstalk differs from other environmental noise because it introduces a systematic error that will repeatedly cause similar erroneous reading. A related kind of "semi-systematic" error is crosstalk that may occur when multiple mobile robots with multiple ultrasonic sensors operate in the same environment. In most indoor applications, crosstalk is much more likely to occur than environmental ultrasonic noise.

When operating a mobile robot under such conditions, it is not practical to base the decision for an obstacle avoidance maneuver on a single (possibly erroneous) sensor reading that seems to indicate the presence of an object in front of the robot. There is a need for combining multiple range samples in order to increase the level of "confidence" which can be placed in the existence of an indicated obstacle, i.e., the signal-to-noise ratio. When traveling at relatively high speed, e.g., $V>0.3$ m/sec, it is crucial to sample each sensor quickly and repeatedly so as to gather multiple samples within the time necessary to avoid a collision. It is a problem with known systems, however, that fast sampling of multiple sensors introduces an increased level of ultrasonic noise in the region of vehicle operation, and increases the occurrence rate of crosstalk.

The two foremost limitations of ultrasonic sensors are susceptibility to noise and susceptibility to specular reflections. With respect to noise, one can distinguish different sources of noise, namely environmental noise, noise from sensors on other mobile robots, and crosstalk from on-board ultrasonic sensors. Specular reflections occur when sound waves do not approach a surface frontally ($\alpha=0°$), but rather at a larger angle (e.g., $\alpha>30°$). If the surface is smooth, it reflects the incident sound waves away from the sensor. Thus, the sensor does not receive an echo and consequently does not "see" the object.

For the POLAROID sensor and others known in the prior art, the active cone has an opening angle of approximately between 15° and 30°. A precise angle cannot be predetermined since the strength of the echo depends, in part, on characteristics of the surface and the orientation of the reflecting object. However, since 15° is the more conservative assumption, many mobile robots have URSs installed on their periphery at 15° intervals, to guarantee complete coverage of the area around the robot in all directions. For omnidirectional robots of circular shape, this design requires 24 (=360°/15°) URSs mounted on a ring around the robot.

An even more important reason for using densely spaced, multiple URSs (arranged in at circular or semi-circular formation around the robot) lies in the ability of this arrangement to overcome, at least partially, the problem of specular reflections, where a mobile robot approaches a smooth wall. When the wall first comes into the range of one of the sensors, the angle α is too large and the incident beam is reflected away from the sensor. Consequently, the robot does not detect the object and continues to travel in the original direction, toward the obstacle. However, moments later the object appears in range of another of the sensors and is detected. A sensor ring with 15° spacing between sensors will detect any object at any orientation, although the robot may have approached the object very closely before this happens. For this reason it is crucial to fire all sensors rapidly, so that an object is detected as soon as it comes in range of a suitable sensor.

Another reason for firing URSs rapidly is the detection of obstacles right in front of the robot. Clearly, there is a close relation between the firing rate of the sensors and the speed at which a mobile robot can travel safely. Since this relation depends strongly on the characteristics of objects in the environment, it is impossible to formulate this relation mathematically. A vague guideline, however, is the observed performance of the commercially available mobile robot from DENNING MOBILE ROBOTICS, INC., 21 Cummings Park, Woburn, Mass. 01801 that can safely avoid most obstacles at 0.3 m/sec, while each one of its 24 URSs is fired once in approximately 300 ms. This speed limit is not imposed by the motors or the on-board computing power (which could easily be improved). Since 0.3 m/sec is insufficient for most applications, there is a need to be able to increase the sampling rate of the ultrasonic sensors.

It is, therefore, an object of this invention to provide an ultrasonic control system which can operate in an environment of high ultrasonic noise generated by the ultrasonic transducers themselves.

It is another object of this invention to provide an ultrasonic navigation system which permits multiple robots to operate in the same environment.

It is also an object of this invention to provide an ultrasonic robotic navigation system which is reliable, robust, and which eliminates the effects of crosstalk.

It is a further object of this invention to provide a navigation system wherein mobile robots can safely traverse obstacle-cluttered environments several times faster than can be achieved with present systems.

It is additionally an object of this invention to provide a robotic navigation system wherein moving objects (e.g., people walking in the robot's path) can be avoided, even if they move at a higher speed than that of the robot.

It is yet a further object of this invention to provide a navigation system for nonvehicle applications, such as whole-arm protection for (stationary) robot arms or electronic travel aids for visually impaired people.

It is also another object of this invention to provide a navigation system which overcomes the problems associated with specular reflections.

It is yet an additional object of this invention to provide an ultrasonic navigation system for a robotic vehicle wherein high sampling rates are achieved to minimize the risk of collision of the vehicle, without unduly increasing the rate of occurrence of crosstalk.

SUMMARY OF THE INVENTION

The foregoing and other objects are achieved by this invention which provides, in accordance with a first aspect thereof, a method of operating a sensor element of the type which issues and receives energy to produce data corresponding to the presence of an article. In accordance with the invention, the method includes the steps of:

triggering the sensor element to issue a first pulse of the energy;

first receiving an energy at the sensor element;

first retriggering the sensor element to issue a second pulse of the energy upon expiration of a first predetermined period of time after the step of first receiving;

second receiving a reflected energy at the sensor elements; and second retriggering the sensor element to issue a pulse of the energy upon expiration of a second predetermined period of time after the step of second receiving.

In one embodiment of the invention, the first and second predetermined periods of time, which correspond to wait times, are of equal duration. However, in other embodiments, the first and second predetermined periods of time are of unequal durations. As will be discussed herein, this assists in achieving high reliability in distinguishing true data, received from a reflection by an article in the field of operation of a vehicle, from noise. Noise, as noted herein, arises from a multiplicity of possible sources, including, manufacturing systems, other ultrasonically navigated vehicles, specular reflections, etc. In a highly advantageous embodiment of the invention, the wait times have predetermined, but different, durations during respective firing cycle periods.

In a practical scheduled embodiment of the invention, a plurality of sensors are configured as a group of sensors, the group having a predetermined number thereof. Triggering occurs sequentially in time for each member of the group, in accordance with a predetermined triggering schedule. Each of the sensors in the group of sensors are triggered once within a predetermined firing cycle period. The group of sensors, in some embodiments, can be replicated to produce a plurality of groups of the sensors. In each such group, triggering occurs simultaneously for each sensor member of the group. In other embodiments, however, triggering occurs sequentially in time for each group.

The duration of a first interval between the steps of triggering and first receiving, and the duration of a second interval between the steps of first retriggering and second receiving, are compared to determine whether the data thus obtained can reasonable be relied upon. Data is rejected as erroneous in response to a difference between the first and second intervals being greater than a predetermined period of time. In still further embodiments of the invention, the period of time between the steps of first and second retriggering is controlled in response to a rate of rejecting data as erroneous. Thus, if the rate of rejecting data is high, the sampling rate of the system is decreased, so that the rejection rate will drop.

In accordance with a further method aspect of the invention, there is provided a method of operating an array of ultrasonic sensor elements of the type which issue and receive ultrasonic energy to produce navigation data for a vehicle. The navigation data is responsive to the presence of an article. This further method aspect includes the steps of:

defining the array of ultrasonic sensor elements as a plurality of groups of n ultrasonic sensor elements;

triggering a first ultrasonic sensor element in each of the groups of ultrasonic sensor elements, to issue a respective first pulse of the ultrasonic energy;

first receiving ultrasonic energy at the first ultrasonic sensor element of each group;

first retriggering the first ultrasonic sensor element to issue a second pulse of the energy after expiration of a predetermined firing cycle period and upon further expiration of a first predetermined period of wait time;

triggering a second ultrasonic sensor element in each of the groups of ultrasonic sensor elements, to issue a respective first pulse of the ultrasonic energy after expiration of a predetermined associated schedule period, the predetermined schedule period having a duration which is less than that of the predetermined firing cycle period;

first receiving ultrasonic energy at the second ultrasonic sensor element of each group; and first retriggering the second ultrasonic sensor element in each group to issue a respective second pulse of the energy after expiration of the predetermined firing cycle period, the expiration of a further predetermined associated schedule period, and upon further expiration of a first predetermined period of wait time.

In one embodiment of the invention, the method is provided with the following further steps:

second retriggering the first ultrasonic sensor element to issue a pulse of the energy upon expiration of a second predetermined period of wait time after the step of second receiving.

Preferably, the first and second predetermined periods of wait time are of unequal durations. The step of second retriggering, the steps of first receiving, first retriggering, second receiving, and second retriggering are repeated during subsequent firing cycle periods. In this manner, the first and second predetermined periods of wait time are alternated during respective alternate firing cycle periods. The predetermined schedule period corresponds approximately to a multiple of $1/n^{th}$ of the predetermined firing cycle period, in an embodiment where n ultrasonic sensor elements are included in each group.

In accordance with a third method aspect of the invention, a method of operating an array of ultrasonic sensor elements of the type which issue and receive ultrasonic energy to produce navigation data for a vehicle, the navigation data being responsive to the presence of an article. The method includes the steps of:

defining the array of ultrasonic sensor elements as a plurality of groups of n ultrasonic sensor elements;

first triggering simultaneously each ultrasonic sensor element in a first group of the ultrasonic sensor elements, to issue a respective first pulse of the ultrasonic energy for each ultrasonic sensor element therein;

first triggering simultaneously each ultrasonic sensor element in a second group of ultrasonic sensor elements, to issue a respective first pulse of the ultrasonic energy for each ultrasonic sensor element therein after expiration of a schedule period from the time of first triggering the first group of the ultrasonic sensor elements and upon further expiration of a first predetermined period of wait time;

first retriggering simultaneously the ultrasonic sensor elements in the first group of ultrasonic sensor elements to issue a second pulse of the energy after expiration of a predetermined firing cycle period and upon further expiration of a predetermined period of wait time; and first retriggering simultaneously the ultrasonic sensor elements in the second group of ultrasonic sensor elements, to issue a second pulse of the ultrasonic energy after expiration of the predetermined firing cycle period and a predetermined associated schedule period, the predetermined schedule period having a duration which is less than that of the predetermined firing cycle period.

In a specific illustrative embodiment of the invention, there are further provided the steps of:

first receiving ultrasonic energy at the second ultrasonic sensor element of each group; and first retriggering the second ultrasonic sensor element in each group to issue a respective second pulse of the energy after expiration of the predetermined firing cycle period, the expiration of a further predetermined associated schedule period, and upon further expiration of a first predetermined period of wait time.

BRIEF DESCRIPTION OF THE DRAWING

Comprehension of the invention is facilitated by reading the following detailed description, in conjunction with the annexed drawing, in which:

FIGS. 8a and 8b are timing diagrams for scheduled asynchronous firing with alternating delays and constant delays.

DETAILED DESCRIPTION

Figure 1:
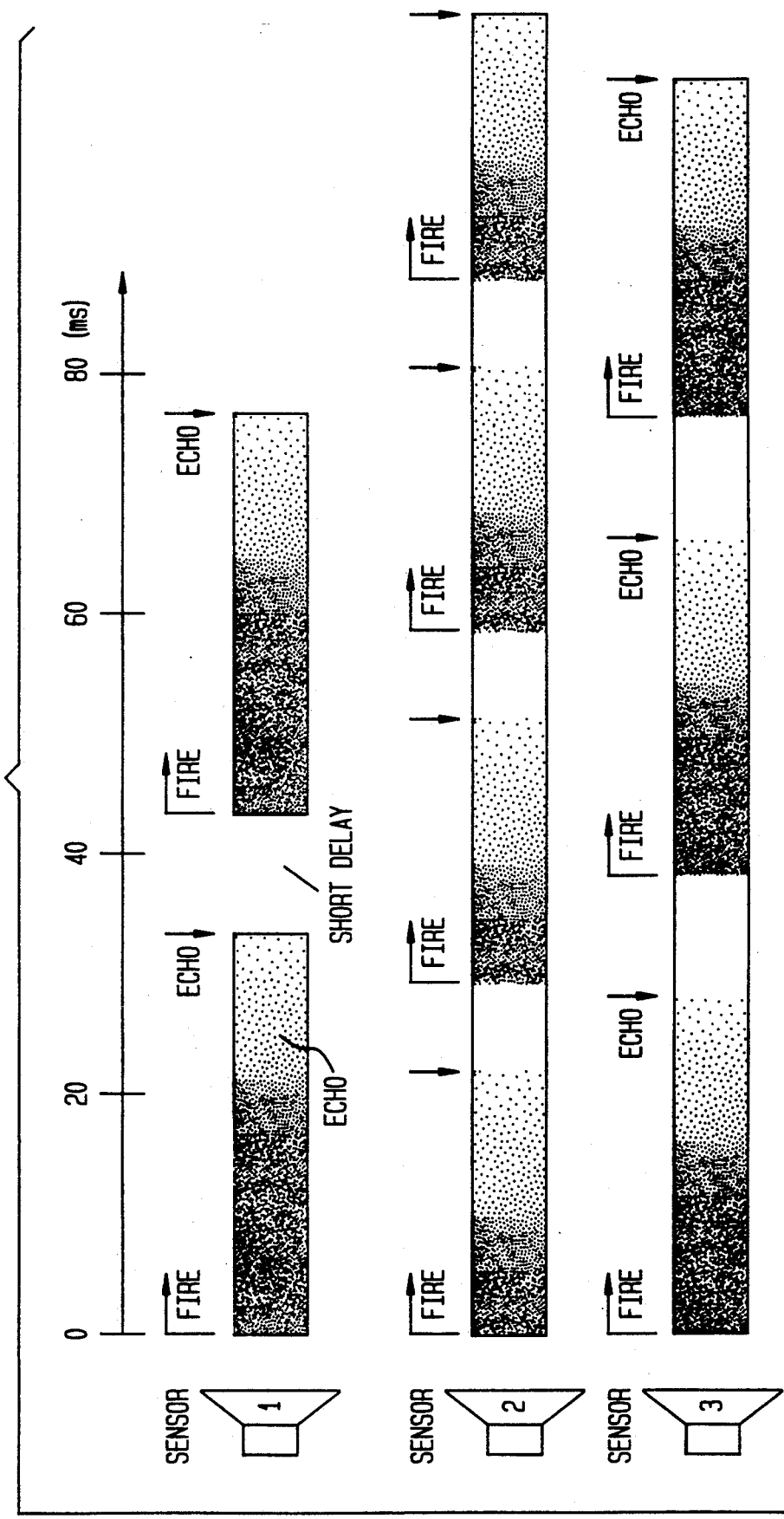
FIG. 1 is a diagram which describes immediate asynchronous refiring of multiple ultrasonic sensor elements.

Prior to describing one or more embodiments of the invention in detail, it would be useful to define certain mathematical terms and expressions which are employed herein.

| | NOMENCLATURE |
|---|---|
| a,b | Index to alternating wait times $T_{wait,a}$ or $T_{wait,b}$. |
| n,m | Index to the nth (mth) occurrence of an event. |
| $P_{noise}$ | Probability for any reading to be caused by random noise. |
| $t_o$ | Start of timing diagrams. |
| x | Sensor causing crosstalk, located at the beginning of a critical path. |
| y | Sensor affected by crosstalk, located at the end of a critical path. |
| $n_c$ | Number of readings taken by one sensor while traveling through the critical distance $D_c$. |
| $C_{R-T}$ | Range-to-time conversion constant = $5.9 \times 10^{-3}$ sec/m. |
| $D_c$ | Critical distance through which the vehicle travels while the same critical path exists. |
| L | Length of a critical path. |
| $P_{diff}$ | Probability for an arbitrary noise reading to fall between |

NOMENCLATURE -continued

| | |
|---|---|
| | $R_{last}$ and $(R_{last}-R_{delta})$. |
| $R_{delta}$ | Maximum allowable range difference between any two consecutive readings. |
| $R_{last}$ | Range measured by a sensor during the previous measurement. |
| $R_{min}$ | Shortest range the ultrasonic sensor is set up to measure. |
| $R_{max}$ | Longest range the ultrasonic sensor is set up to measure. |
| $T_{ct}$ | The (absolute) time at which crosstalk occurred. |
| $T_{delta}$ | Maximum allowable time difference between any two consecutive readings. |
| $T_{echo}$ | Time from firing to receiving an echo. |
| $T_{err}$ | Erroneous reading, caused by crosstalk. |
| $T_{fire}$ | Amount to time from the beginning of a period to the actual firing of a sensor. |
| $T_{idle}$ | Amount of time from receiving an echo to the beginning of the next period. |
| $T_{i,nom}$ | Nominal time interval between scheduled firings of the sensors in a group. |
| $T_{i,min}$ | Shortest time interval between actual firings of the sensors in a group. |
| $T_{lag}$ | Amount of time a sensor is scheduled for firing after the beginning of a period. |
| $T_p$ | Time period. The amount of time in which each sensor is fired once. |
| $T_{wait}$ | The amount of time the algorithm of the present invention, EERUF, waits before firing a sensor, after the sensor was already scheduled for firing. |
| $T_{wind}$ | Time window—the amount of time a URS is "open" to await an echo. |
| $T_{L,n}$ | Amount of time sound waves spend on traveling through the critical path. |
| V | Momentary speed of the vehicle. |
| $V_{max}$ | Maximum speed of the vehicle. |
| α | Angle between an incident sound wave and the normal to a reflecting surface. |

GLOSSARY

Active cone—The cone-shaped propagation envelope for ultrasonic sound-waves.

Adaptive scheduling—A firing method in which firing schedules may change continuously in order always use the best suited schedule for given conditions.

Alternating delays—A firing method in which sensors wait a certain amount of time before firing. This time alternates between two distinct delays, labeled a and b.

Asynchronous (firing)—A firing mode in which sensors are fired while others are still waiting for an echo.

Comparison of consecutive readings—A method for identifying erroneous readings in which any two consecutive readings of the same sensor are compared. If reading differ by more than a small difference $T_{delta}$, the last reading is considered an error.

Critical path—any physical path of ultrasound waves that are transmitted by one sensor and are received by another, thus (potentially) creating crosstalk.

Crosstalk—An undesirable phenomena in which one ultrasonic sensor receives the echo of a signal from another ultrasonic sensor, causing an erroneous reading.

Direct path—A critical path in which ultrasound-waves are reflected off one wall only, or, in conjunction with noise from other mobile robots, where no reflections are involved.

Double-echo—A phenomena that may occur when sensors are fired near a wall: ultrasound waves are reflected off the wall, return to the vehicle, are reflected off the vehicle back to the wall, and are reflected back from the wall to the vehicle.

Error-eliminating rapid ultrasonic firing (EERUF)—The method of the present invention that allows rapid firing of ultrasonic sensors while rejecting errors due to the resulting crosstalk.

Indirect path—A critical path in which ultrasound-waves are reflected off three walls, or, in conjunction with noise from other mobile robots, where some reflections are involved.

Near-identical readings—any two consecutive sensor readings that differ only by a small amount $T_{delta}$.

Period—The amount of time in which all sensors are fired once and a given firing schedule is executed.

Scheduled firing—A firing mode in which every sensor is fired at a predefined time.

Specular reflections—A phenomenon that may occur when sound waves approach a surface not frontally (α=0°) but at a larger angle (relative to the normal to the reflecting surface.) If the surface is very smooth, then the incident ultrasound waves are reflected away from the sensor and no echo is returned.

Synchronous firing—A firing mode in which no sensor is fired while another is still waiting for an echo.

Time-of-flight (TOF)—the time required for sound-waves to travel from the ultrasonic sensor to an object and return (as an echo) to the sensor.

Time window ($T_{wind}$)—The time a URS is "open" to await an echo.

The disclosure herein will focus on three firing methods for multiple ultrasonic sensors:

1. Immediate asynchronous re-firing (FIG. 1) of each individual sensor after it receives an echo.

Figure 2:
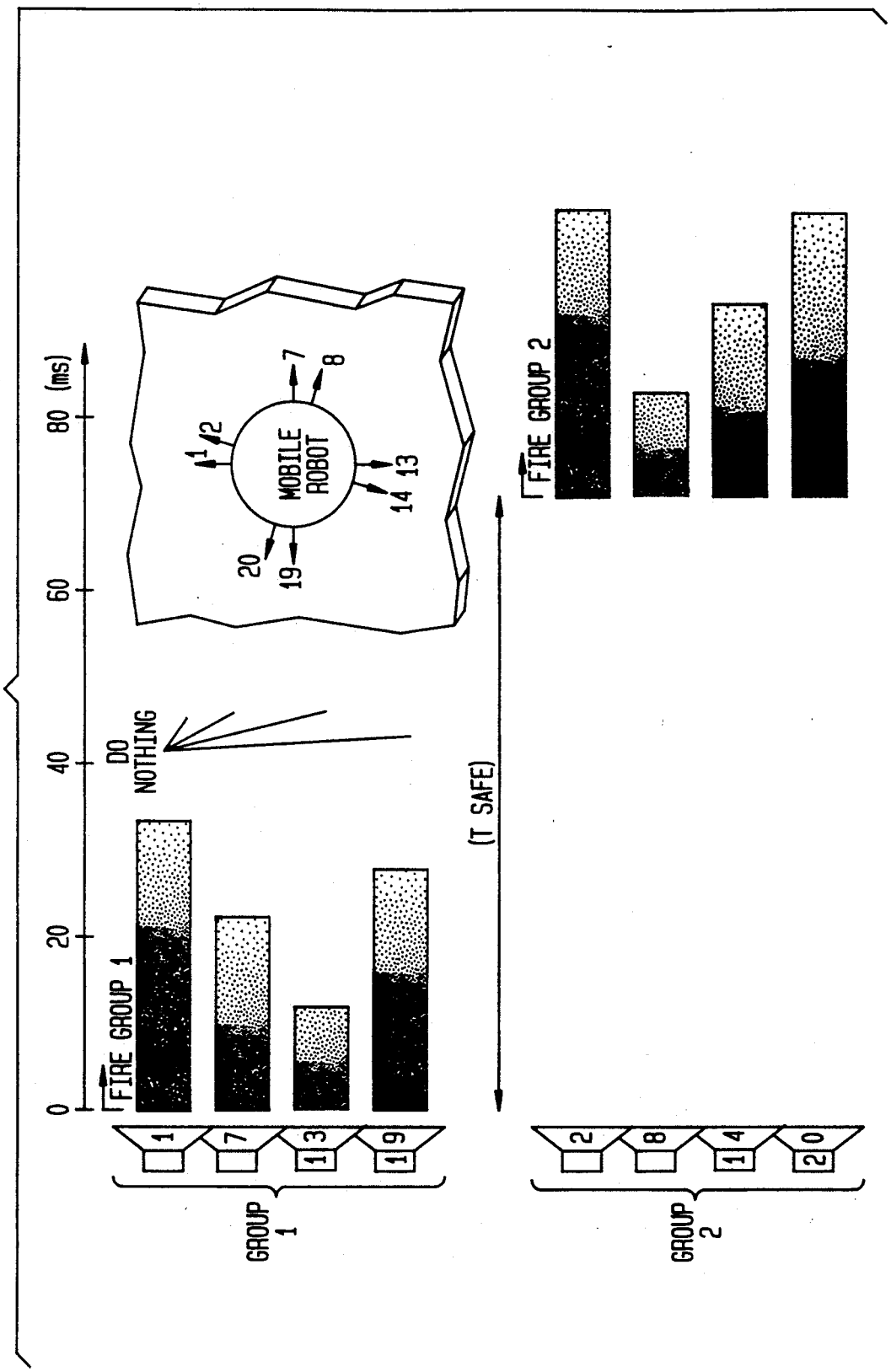
FIG. 2 is a diagram which describes scheduled asynchronous firing of multiple ultrasonic sensor elements.

2. Scheduled synchronous firing (FIG. 2) of a small group of sensors simultaneously. The number of sensors in a group is usually a function of the hardware. Typically 3, 4, or 6 sensors make up one group. In synchronous operation the algorithm always waits for $T_{wait}=T_{wind}$ after firing a group of sensors (even if all sensors in the group received an echo earlier), before it fires the next group.

Figure 3:
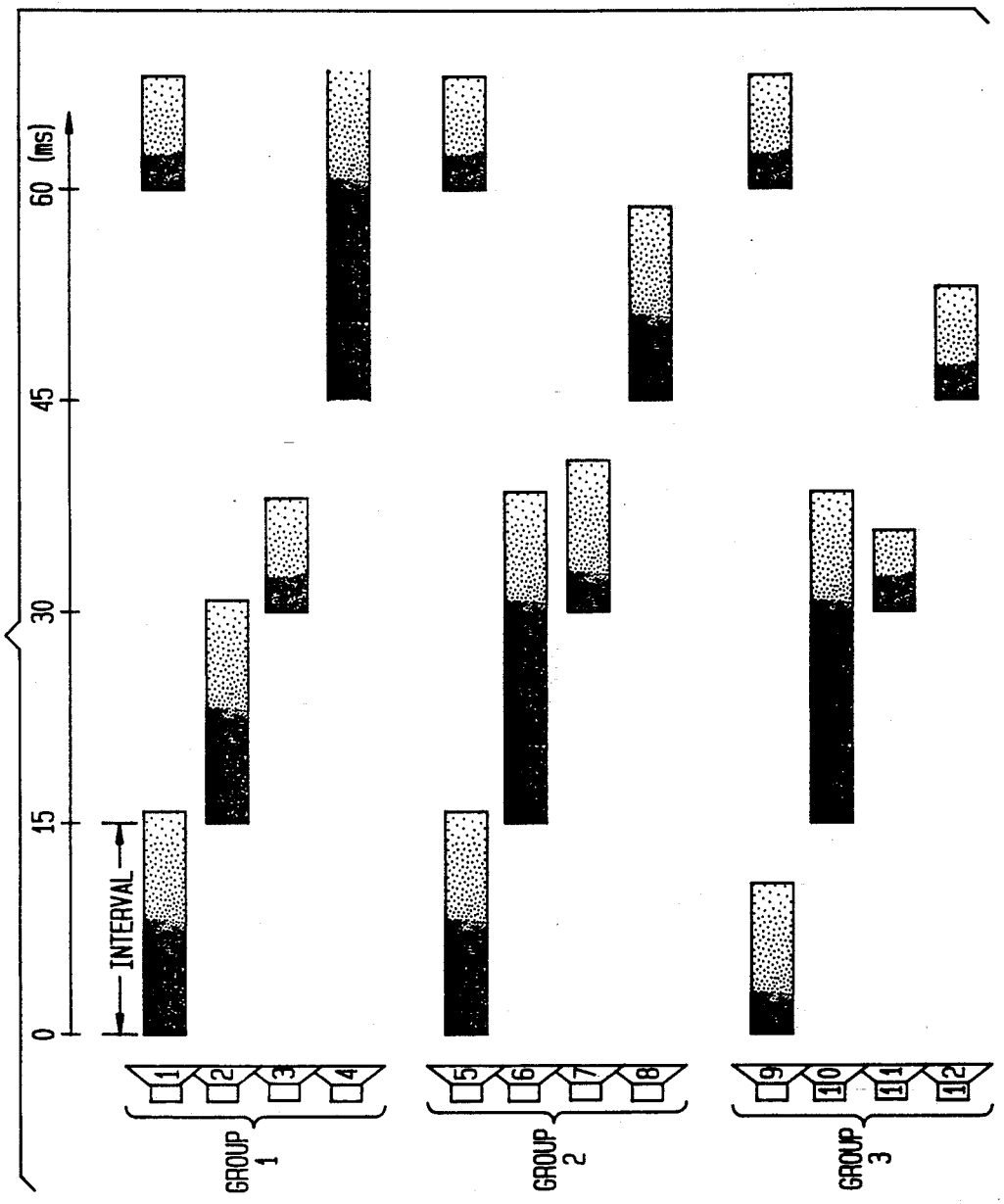
FIG. 3 is a diagram which describes scheduled synchronous firing of multiple ultrasonic sensor elements.

3. Scheduled asynchronous firing (FIG. 3) which is similar to 2) except that any 4 neighboring sensors are now a group. Members of a group are fired at fixed intervals, even while another sensor in the group is still waiting for its echo (i.e., $T_{wait}<T_{wind}$).

None of the known mobile robots described in the literature uses the faster, asynchronous firing methods (1 or 3, above), and neither of the two commercially available multiple ultrasonic sensor systems (manufactured by [DENNING] and [TRC]) support asynchronous operation in hardware.

To achieve asynchronous operation, individual modules of the Texas Instruments SN 28827 Sonar Ranging Module were combined with each other. This system is based on individual sensors with individual electronic circuits, and thus supports asynchronous operation. Also, the term "critical path" is any path of reflected ultrasound waves that are transmitted by one sensor and are received by another, thus creating crosstalk. The sensor that transmitted the ultrasound waves is denominated x, and the receiving sensor is denominated y.

To understand the functioning of our noise rejection method we must investigate the different types of ultrasonic noise that might degrade the sensors' performance:

ENVIRONMENTAL ULTRASONIC NOISE

Environmental Ultrasonic noise may occur near certain machine tools or possibly in the vicinity of discharging high pressure air or other fluid-flow installations. Possible sources are not well-investigated—mostly because this kind of noise occurs only in rare instances. Theoretically, powerful, persistent ultrasonic noise can completely disable ultrasonic sensors (jamming), although this is considered to be a highly unlikely condition. More likely is a situation where a machine sweeps through the spectrum of ultrasonic frequencies during power-up or power-down, briefly covering the particular frequency range to which the URS is sensitive.

ENVIRONMENTAL NOISE FROM OTHER ULTRASONIC SENSORS

Figure 4:
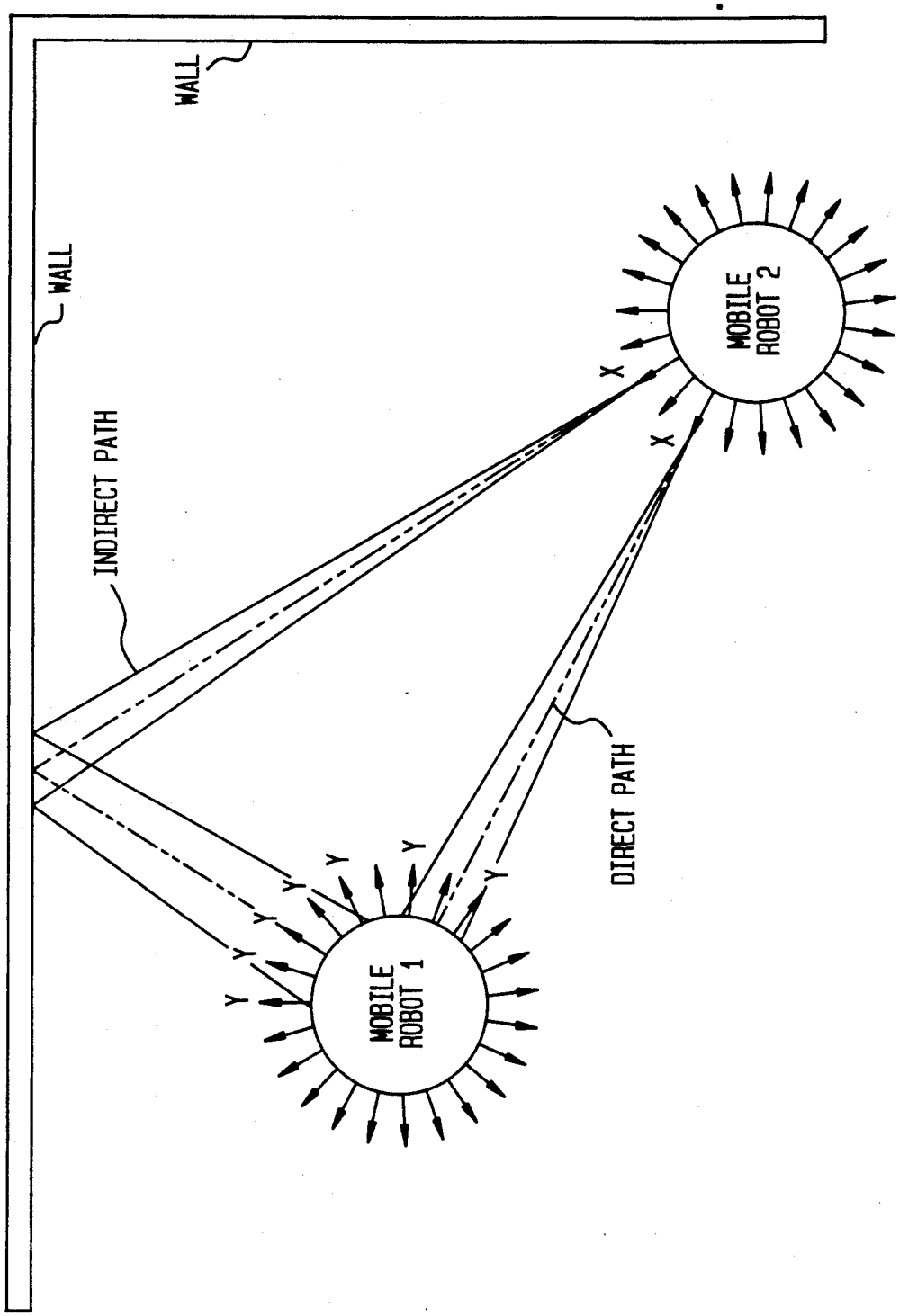
FIG. 4 is a diagram which illustrates ultrasonic noise generated by another mobile robot.

FIG. 4 illustrates that this type of noise is very likely to occur when more than one vehicle with ultrasonic sensors operate in the same environment. Typically, multiple vehicles would use the same kind of URSs, which, unfortunately, would guarantee mutual interference. In fact, the direct path results in a powerful disturbance. Such noise from URSs on other vehicles can be considered as environmental noise, although one could make a distinction to other environmental noise because the URSs on both vehicles may have similar firing patterns and may be synchronous.

INTERNAL NOISE FROM ON-BOARD ULTRASONIC SENSORS—CROSSTALK

Figure 6:
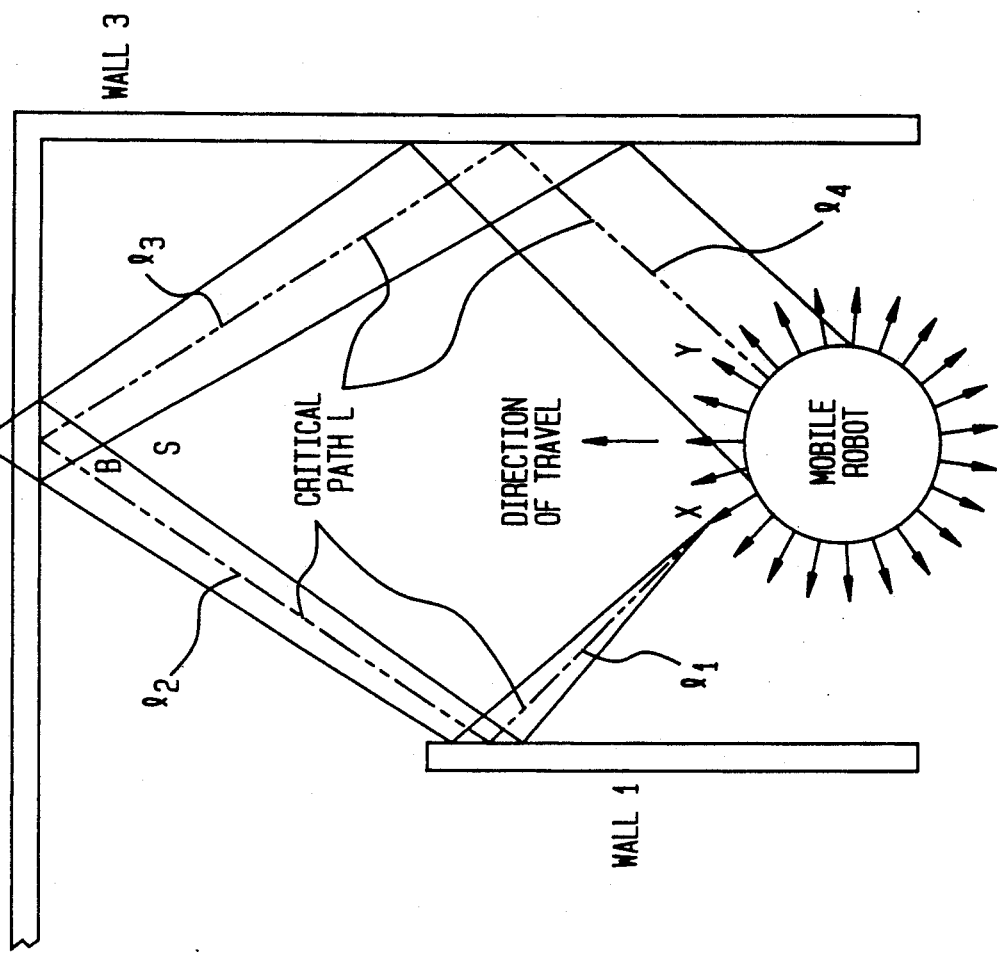
FIG. 6 is a diagram which illustrates crosstalk generated via an indirect critical path.
Figure 5:
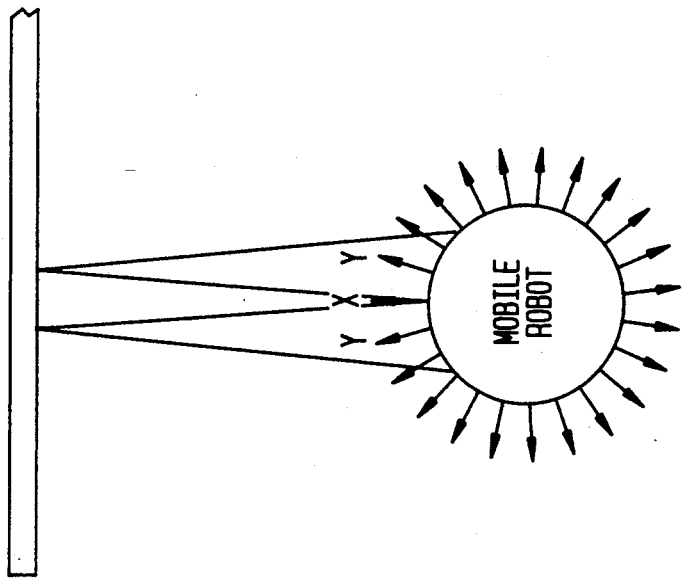
FIG. 5 is a diagram which illustrates crosstalk generated via a direct critical path.

FIGS. 5 and 6 show a mobile robot equipped with multiple URSs in two typical indoor environments. Both environments differ substantially in the way they promote crosstalk. FIG. 5 shows a direct critical path, where the robot is near a single wall. Because of the symmetry in FIG. 5, two sensors are labeled 'y', since they are both on a critical path with sensor x. If sensors y were fired shortly after sensor x, they would be awaiting the echo to their own signals by the time the echo from sensor x reaches them. Thus, the reading from sensors y would result in some arbitrary error, depending on the time difference $T_{lag}$ between firing sensors x and y. When the sensors are fired in a scheduled manner, the problem in FIG. 5 is not so severe, since it is possible to avoid crosstalk by carefully planning the firing sequence.

The situation is more complex for the indirect critical path in FIG. 6. Here, at an instance $t_0$, sensor x is fired and its sound-waves are reflected off three walls. Assuming the walls are fairly smooth (e.g., drywall), the reflected wavefront will reach sensor y after traveling through the distance $L = l_1 + l_2 + l_3 + l_4$. If, at this time, sensor y is awaiting an echo of its own, then it will receive the signal from sensor x and interpret it as its own echo. Note that critical paths may also exist when the robot is traveling off the center line between corridor walls.

As is evident from FIG. 6, crosstalk is not a phenomena that occurs only under very extreme conditions. In fact, crosstalk is a much more severe source of error than sporadically occurring misreadings due to ultrasonic noise in the environment.

FIG. 6 shows the conical propagation profile of a wavefront generated by sensor x. In FIG. 6, this profile is only 5° wide (while the actual width is usually 15° to 30°), to consider only that portion of the wavefront that holds most of the ultrasonic energy (i.e., close to the acoustic axis). A reasonable assumption is made that any receiving sensor placed in the (larger) area of the reflected cone (i.e., after completing the round trip of length $L = l_1 + l_2 + l_3 + l_4$) is a candidate for crosstalk. Thus, the two sensors adjacent to sensor y are candidates for crosstalk, too, but focus in the following discussion will be on sensor y only.

For the symmetric case depicted in FIG. 6 it is clear that similar symmetric conditions prevail when the robot is a little closer or further from wall 2, as long as wall 2 lies between points a and b (located on the axes of symmetry, S). Therefore, the critical path of FIG. 4b exists while the robot travels through the distance $D_c = \overline{ab}$. For the geometric conditions in FIG. 4b, $D_c = 0.60$ m (approximately). Assuming a travel speed of $V = 1$ m/sec and a synchronous or asynchronous sampling rate of $T_p = 60$ ms for each sensor, sensor y will sample $$n_c = \frac{D_c}{VT_p} = \frac{0.60}{1 \times 0.06} = 10$$

readings. All of these readings will differ only slightly from each other but will be totally false, since they result from crosstalk. Once a critical path exists, crosstalk is a particularly damaging condition because it will continuously cause false readings in sensor y, until the robot moves out of the critical path situation. The occurrence of crosstalk is predictable, repeatable, and can be analytically formulated. Such formulation, however, is of little practical value since many of the parameters (e.g., reflectivity of the reflecting surfaces, obstacle clutter, and actual gain of the sensor's amplifier) are difficult to measure. Nevertheless, the factors that influence the occurrence of crosstalk may be considered as follows:

a. The URS acts on the first echo it receives. Thus, if a reflecting object is close-by, its echo is more likely to return to the sensor (before a crosstalk-echo does) than if it was further away. The worst case is that no object is in range of the sensor and the sensor is "open" for crosstalk signals for the total period of $T_{wind}$.

b. As FIG. 6 shows, crosstalk signals can result from multiple reflections off several walls. If these walls are very reflective, the reflected signal is stronger and can travel a longer distance before it becomes too weak to be detected.

c. As previously discussed, the gain of most URS receiver circuits increases with time. Therefore, if sensor y does not receive its echo soon after firing, its gain increases and it becomes more susceptible to stray signals and noise. Specular reflections particularly promote this condition since sensor y will wait (in vain) for the whole period $T_{wait}$ for an echo to its own signal. Note that the situation in FIG. 4b is a typical example of this case since the angle between sensor y and the normal to wall 3 is very large and is likely to produce specular reflections.

In summary, erroneous readings due to crosstalk occur whenever all of the following three conditions are met:

a. A critical path exists between any two ultrasonic sensors x and y.

b. Sensor y is waiting for an echo when the signal from sensor x reaches sensor y.

c. The crosstalk signal is strong enough to register as an echo in sensor y.

Experimental observations indicate that in an indoor environment up to 20% of all sensor readings can result from crosstalk, when firing at a slow rate of 120 ms. At faster firing rates, up to 90% of all readings can be in error, because of crosstalk.

A variety of combinations have been tested, but the discussion herein is limited to the three combinations that yielded the best performance. Before discussing these combinations in detail, a brief summary is provided in Table I.

TABLE I

Performance of different methods.

| Method (Combination of firing method with error rejection method). | Type of Noise | | | Typical scan-rate [ms] |
|---|---|---|---|---|
| | External random noise | Crosstalk - Direct path | Crosstalk - Indirect path | |
| Conventional Method: | | | | |
| Firing: Scheduled, synchronous | Very poor | Good | Very poor | 300–600 |
| Error Rejection: None | | | | |
| Method 1 {Sect. 2.1}: | | | | |
| Firing: Scheduled, synchronous firing | Good | Good | Poor | 160 |
| Error Rejection: Comparison of consecutive readings | | | | |
| Method 2 {Sect. 2.2}: | | | | |
| Firing: Asynchronous immediate re-firing | Good | Poor | Good | 20–60 |
| Error Rejection: Comparison of consecutive reading with alternating delays | | | | |
| Method 3 {Sect. 2.3}: | | | | |
| Firing: Scheduled asynchronous firing | Good | Good | Good | 40–100 |
| Error Rejection: Comparison of consecutive readings with alternating delays | | | | |

Note that the method labeled "Conventional" is a generic method without noise rejection. Typically "conventional" methods fire groups of sensors in a scheduled, synchronous manner. Conventional methods are used on the commercially available mobile robots from TRC and DENNING, as well as on different research vehicles

METHOD 1

COMPARISON OF CONSECUTIVE READINGS

One simple method for eliminating occasional random noise is to compare two consecutive readings from the same sensor. The difference between any two consecutive readings, $T_{delta}$, is small if the readings result from "good" measurements (i.e., not caused by noise). One cannot assume $T_{delta}=0$ because of the robot's motion and the discrete resolution of the sensors. An upper bound for $T_{delta}$ can be computed precisely as shown in the example in Section 2.4. In the following discussion, consecutive readings that differ only by less than a small amount, $T_{delta}$, are considered as near-identical readings. However, if a reading was caused by random noise, it is highly unlikely to be near-identical to the previous reading, whether the previous reading was "good" or caused by noise, too. Thus, comparison of consecutive readings can identify false readings due to environmental noise and subsequently reject such readings.

Shortcomings of Method 1

While comparison of consecutive readings is an efficient way to reject false readings caused by random noise, it is unsuitable for reducing crosstalk. This is so because crosstalk does not occur at random, as can be seen in FIGS. 5 and 6: If, for example, sensor y was always fired a fixed period of time ($T_{lag}$) after sensor x, then sensor y would repeatedly produce near-identical erroneous readings $T_{err}$, until the spatial conditions in the environment have changed so much (due to the robot's motion) that y does not receive the signal from x (i.e., the critical path is interrupted).

Figure 7A:
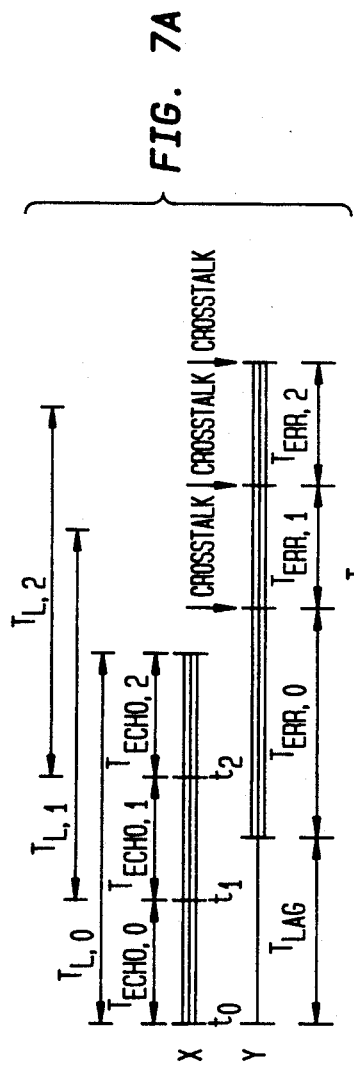
FIGS. 7a, 7b, and 7c are timing diagrams for asynchronous immediate refiring with no wait times, constant wait times, and alternating wait times.

This aspect of the present invention is disclosed herein with the aid of the timing diagram in FIG. 7a. The first firing of sensor x after a critical path is established is labeled $t_0$. Sensor y is fired some arbitrary time $T_{lag}$ later. For the illustrative embodiment represented the configuration given in FIG. 7b, the sound waves travel through the critical path L in the time $T_{L,n}$ (for the nth firing, with $n=0,1,\ldots$), resulting in an erroneous reading $T_{err,n}$ in sensor y. Sensor x receives its "legitimate" echo after a period $T_{echo,n}$. It is assumed that $T_{echo,n}$ and $T_{L,n}$ change only insignificantly between subsequent readings. To simplify the mathematical treatment, it is assumed that $T_{L,n} \approx T_{L,n-1}$ and $T_{echo,n} \approx T_{echo,n-1}$ for all n. This assumption is justifiable since the interest herein lies only in comparing consecutive readings that differ at most by a small amount $T_{delta}$.

If each sensor is re-fired immediately after it receives its first echo, one can express the times at which crosstalk occurs ($T_{ct}$) as follows:

For sensor x:

$$T_{ct}(n) = (n-1)T_{echo} + T_{L,n} \text{(for } n=1,2,\ldots\text{)} \qquad \text{Eq. (1).}$$

For sensor y:

$$T_{ct}(n) = T_{lag} + \sum_{m=0}^{n-1} T_{err}(m) \qquad \text{Eq. (2)}$$

(for $n = 1, 2 \ldots$ and $m = 0, 1, \ldots$)

The first erroneous reading due to crosstalk is denoted as $T_{err,0}$ and is given by (see, FIG. 7a):

$$T_{err,0} = T_{L,0} - T_{lag} \qquad \text{Eq. (3)}$$

rewriting Eq. (2) as $$T_{ct}(n) = T_{lag} + T_{err,0} + \sum_{m=1}^{n-1} T_{err}(m) \qquad \text{Eq. (4a)}$$

Eq. (3) is then substituted into Eq. (4a)

$$T_c(n) = T_{L,O} + \sum_{m=1}^{n-1} T_{err}(m) \quad \text{Eq. (4b)}$$

equating Eq. (4b) to Eq. (1) yields $$(n - 1)(T_{echo}) = (T_{L,O} - T_{L,n}) + \sum_{m=1}^{n-1} T_{err}(m) \quad \text{Eq. (5a)}$$

assuming that $T_{L,n} \approx T_{L,n-1} \pm T_{delta}$ $$(n - 1)(T_{echo}) = \pm(n - 1)T_{delta} + \sum_{m=1}^{n-1} T_{err}(m) \quad \text{Eq. (5b)}$$

Equation (5b) means that $n-1$ terms of $T_{err}(n)$ equal $(n-1)(T_{echo} \pm T_{delta})$. This equation holds true only if $$T_{err} = T_{echo} \pm T_{delta} \quad \text{Eq. (6)}.$$

Thus, if a critical path exists between sensor x and sensor y, then sensor y will first produce one erroneous reading $T_{err,0}$, and will then continuously produce near-identical erroneous readings. Since the method of comparison of consecutive readings considers near-identical readings as valid, it cannot guarantee to eliminate this crosstalk error.

Figure 7B:
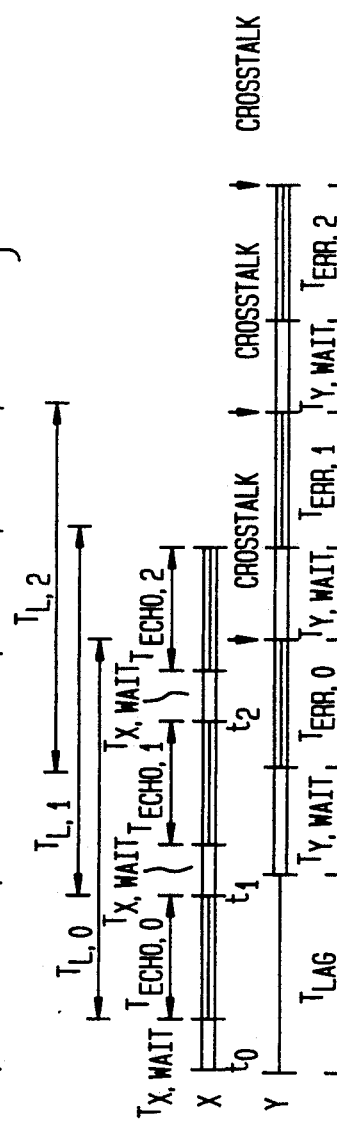

The timing diagram in FIG. 7b shows the more realistic scenario of a constant delay $T_{wait}$ before re-firing sensors. Each sensor has its own constant delay, denoted $T_{x,wait}$ and $T_{y,wait}$, for sensors x and y, respectively.

Writing the timing equations similar to the above example, one obtains:

$$T_{err,0} = T_{x,wait} + T_{L,0} - T_{y,wait} - T_{lag} \quad \text{Eq. (7)}$$

and $$T_{err,m} = (T_{x,wait} - T_{y,wait}) + (T_{echo,m} \pm T_{delta})(\text{for } m=1,2,\ldots n) \quad \text{(8)}$$

for all subsequent crosstalk readings.

Again, a systematic error is produced that is near-constant since $T_{echo} \pm T_{delta}$ is near-constant. Consequently, one cannot identify erroneous readings due to crosstalk by comparison of consecutive readings.

METHOD 2

Comparison With Alternating Delays—Immediate Re-firing

Figure 7C:
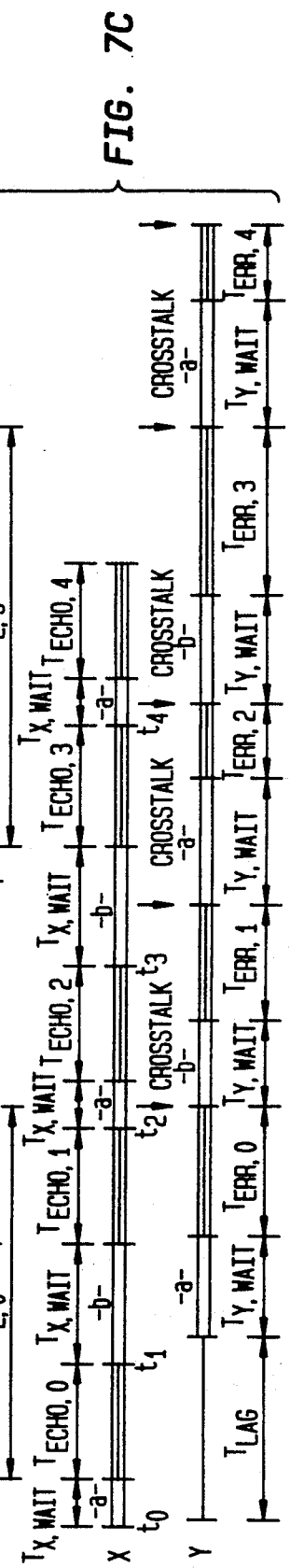

To overcome this problem, an alternating delay $T_{wait}$ is introduced before each sensor is fired (FIG. 5c). For each sensor i, $T_{wait}$ alternates between two values, $a_i$ and $b_i$. $a_i$ and $b_i$ can be very small, on the order of a few milliseconds. Now, any sensor i can be re-fired immediately after receiving an echo, and after waiting for the short period of time, $T_{i,wait}$. After each firing, $T_{i,wait}$ is toggled between $T_{i,wait,a}$ and $T_{i,wait,b}$. FIG. 7c shows the timing diagram for scheduled asynchronous firing with alternating delays.

Writing individual timing equations in a similar manner as above but for each n separately, the following expressions for error readings n are derived:

$$T_{err,0} = T_{x,wait,a} + T_{L,0} - T_{y,wait,a} - T_{lag}, (\text{for } n=0) \quad \text{Eq. (9)}$$

$$T_{err,n} = T_{x,wait,b} + T_{y,wait,b} + T_{echo,0}(\text{for } n=1,3,5,\ldots) \quad \text{Eq. (10a)}$$

$$T_{err,n+1} = T_{x,wait,a} - T_{y,wait,a} + T_{echo,1}(\text{for } n=2,4,6,\ldots) \quad \text{Eq. (10b)}.$$

The first crosstalk reading produces an arbitrary erroneous reading $T_{err,0}$. However, subsequent errors alternate between Eqs. (10a) and (10b). Recall that it is desired to identify and discard crosstalk readings based on an artificially introduced difference between consecutive readings. Protection from crosstalk is achieved by rejecting every reading that differs by more than $T_{delta}$ from the preceding one, that is Substituting Eqs. (10) into Eq. (11), it is noted that all elements of Eqs. (10) are positive $$||T_{x,wait,a} - T_{y,wait,a}| - |T_{x,wait,b} - T_{y,wait,b}|| - |T_{echo,n+1} - T_{echo,n}| > T_{delta} \quad \text{Eq. (12)}$$

Since consecutive legitimate echoes differ by no more than $T_{delta}$ (i.e., $|T_{echo,n+1} - T_{echo,n}| < T_{delta}$), Eq. (12) is rewritten as:

$$||T_{x,wait,a} - T_{y,wait,a}| - |T_{x,wait,b} - T_{y,wait,b}|| > 2T_{delta} \quad \text{Eq. (13a)}.$$

Finally, it should be noted that the timing diagram in FIG. 7c and the timing equations (9) and (10) were written for the case where both sensors x and y started with $T_{wait}$ in status a. Just as well, either one may have started in status b. To account for this (equal) possibility, one needs to ensure that:

$$||T_{x,wait,a} - T_{y,wait,b}| - |T_{x,wait,b} - T_{y,wait,a}|| > 2T_{delta} \quad \text{Eq. (13b)}.$$

Thus, upon determining the set of 2i values for all $T_{i,wait,a}$ and $T_{i,wait,b}$ that meets the conditions of Eq. (13), crosstalk errors can be identified and rejected. This is explained below in the section entitled "Choosing Timing Parameters for EERUF."

One should note that "good" readings are unaffected by this scheme, since echo-readings from actual obstacles are independent of the alternating delays and will be near-identical, differing at most by $T_{delta}$.

Shortcomings of Method 2

Among the firing methods listed in Table I, immediate re-firing with alternating delays allows the fastest firing rate while rejecting noise and crosstalk. In practice, however, this method does not work well under certain conditions. These conditions occur for direct path crosstalk, when some of the URS are close to a wall (e.g., 50-120 cm). Even at path crosstalk, when some of the URS are close to a wall (e.g., 50-120 cm). Even at 120 cm, the round trip time for the sound waves is only 7 msec. Adding a few milliseconds for different $T_{wait}$, a sensor can be fired every 10 msec. With 4 sensors facing one wall, this results in one firing every 2.5 msec, on average. This condition practically saturates the environment with noise and almost all readings are erroneous and rejected. Consequently, only as little as 5% of the readings are accepted yielding an effective firing rate of 10 ms/5% = 200 ms and the advantage of rapid firing is lost.

Furthermore, the inventors herein have observed an adverse effect that is not covered by the present method: This effect occurs when sound waves are reflected from a near-by wall, bounce off the vehicle body, and go for a second round-trip to the wall and back. This way, each firing generates actually 2 echoes ("double-echo"), resulting in even denser noise saturation. While the first echo from a sensor can be modeled by Eqs. (1)–(13), the second echo is arbitrary and can occur at any time. Thus, the chances of the difference between two consecutive erroneous readings of one sensor being less than $T_{delta}$ increase dramatically. In experiments with Method 2 (with a close-by wall) average rejection rates of 90% and error rates of 5% were observed. With only 10% acceptance and 5% errors, these results correspond to 50% errors per accepted readings.

One way to work around this problem is to reduce artificially the firing rate by using larger values for $T_{wait}$. In the course of experiments conducted by the inventors it was found that average waiting times of 10–15 ms (resulting in average firing rates of 15–20 ms) improved performance dramatically. This observation led to the development of a third method, where sensors are fired at scheduled intervals. This method yields excellent results and is described next.

METHOD 3

Comparison With Alternating Delays—Scheduled Asynchronous Firing

To understand this method, consider k URSs spaced at 15° intervals and labeled 1, 2, ... k. It has been experimentally determined that for a close-by wall (worst case), direct path crosstalk can affect 3 neighboring sensors (for example, when sensor #1 fires, sensors #2, #3, and #4 can receive the direct path echo). In order to avoid crosstalk in the first place (rather than having to reject an erroneous echo), each sensor in a set of 4 neighboring sensors is fired at a scheduled interval (see, FIG. 3). The intervals should be large enough to allow the echo of, say, sensor #1 to return from a near-by wall before any other of the 4 sensors is fired. Experimentally, it was found that intervals of 15 ms work well. This time (15 ms) corresponds to a distance of 2.5 m between the wall and the sensors. Thus, firing sensors #1 to #4 at scheduled times $T_{lag}=0$, 15, 30, and 45 ms, respectively, eliminates most direct path crosstalk resulting from objects up to 2.5 m away.

Figure 9:
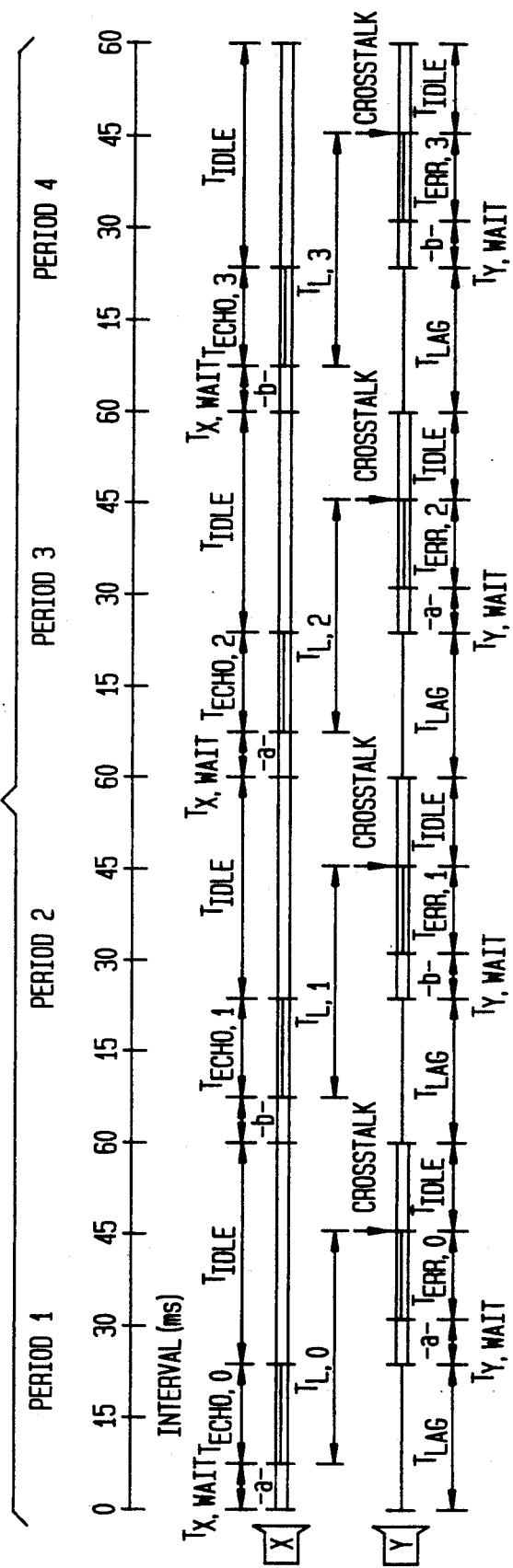
FIG. 9 is a timing diagram which illustrates error rejection with scheduled asynchronous firing and alternating wait-states.

The scheduled firing scheme can be combined with the method of comparison of consecutive readings and the method of alternating delays and obtain the third version of EERUF. This version is implemented as follows (see FIGS. 8 and 9):

1. Sensors #1–#4 are scheduled for firing at intervals $T_{lag}=0$, 15, 30, and 45 ms.
2. Subsequent groups of four sensors (e.g., #5–#8) uses the same intervals (0, 15, 30, and 45 ms).
3. Sensors don't actually fire at their scheduled times, but rather commence a waiting period $T_{wait}$.
4. Waiting periods $T_{wait}$ alternate between two different values, a and b. Each sensor i has its own distinct set of $T_{wait,a}$ and $T_{wait,b}$.
5. Thus, a sensor is actually fired at time $T_{lag}+T_{wait}$.
6. Every sensor is fired exactly once within each period of $4\times15=60$ ms.

FIG. 8 has three purposes:
1. to show a typical timing diagram for Method 3,
2. to show that crosstalk can be rejected by comparing consecutive readings, provided alternating delays are used (FIG. 8a),
3. to show that crosstalk will cause identical errors (which cannot be distinguished from "good" readings), when alternating delays are not used (FIG. 8b).

FIG. 8 is fairly complex and is best understood by distinguishing the top, middle, and bottom rows in respective FIGS. 8a and 8b. The top row shows several periods, each divided into 4 intervals of 15 ms. The middle row shows the timing of a given sensor x which happens to be scheduled at $T_{lag}=0$. At $t=T_{lag}$, sensor x begins a short waiting period, $T_{x,wait}=a$. Then, sensor x is fired and awaits its echo. After the first echo is received ($T_{echo,0}$) sensor x does nothing ($T_{idle}$) until the end of the first period. This sequence repeats itself during the second period, with the exception that now sensor x waits for $T_{x,wait}=b$ before firing.

The bottom row shows the events for sensor y (the sensor affected by crosstalk from sensor x). In the example here, sensor y is scheduled for firing at $T_{lag}=30$ ms. After waiting for $T_{y,wait}=a$ (recall that each sensor has its own set of values a and b), y is fired and awaits its echo. However, assuming a crosstalk path of length L exists between sensors x and y, a crosstalk echo is received by sensor y $T_{L,0}$ ms after sensor x was fired, causing an erroneous reading of $T_{err,0}$ in sensor y. After receiving the (erroneous) echo, sensor y idles until the end of the period. This sequence repeats itself during the second period, with the exception that now y waits for $T_{y,wait}=b$ before firing.

As can readily be seen from this timing diagram, the erroneous readings $T_{err,n}$ differ from $T_{err,n-1}$ and can thus be identified and rejected. By contrast, FIG. 8b shows the timing diagram without alternating delays. Here all errors $T_{err,n}$ are equal (or differ by at most a small amount $T_{delta}$) and would therefore be accepted.

Although Method 3 differs functionally from Method 2, a formal mathematical analysis, as presented for Method 2, is omitted because of the similarity between the two methods. Like Method 2, Method 3 is implemented by defining a set of unique values a and b to each sensor, which meet the conditions Eq. (13a) and Eq. (13b). Such values are shown in Table Id, below. Note that times $T_{lag}$ and $T_{wait,a/b}$ can be combined for each sensor, since these times always follow each other. They are, however, listed separately in Table Id so as not to obscure the pattern.

Choosing Timing Parameters for EERUF

To implement EERUF Method 3, the following constraints must be met.

a. The Alternating Wait-Times Constraint

This constraint is the set of conditions established in Equations (13a) and (13b).

b. The Maximum Speed Constraint

This constraint expresses the relation between $T_{delta}$ and the robot's maximum speed $V_{max}$. This relation is established as follows: When the robot approaches an obstacle at a certain speed, consecutive distance readings to that object will slightly differ. Theoretically, the maximum difference between two readings, $D_{delta}$, occurs for the front-facing sensors when the robot travels at its maximum speed, and is defined by $$D_{delta}=V_{max}T_p \qquad \text{Eq. (14)}$$

where $T_p$ is the period (i.e., the time in which each sensor is fired once).

Next, the range-to-time conversion constant $C_{R-T}=5.9\times10^{-3}$ sec/m is defined. Recall that an echo-time of 1 ms corresponds to 17 cm range-distance and a range-distance of 1 cm corresponds to 0.059 ms echo-time. The maximum allowable difference between two consecutive "good" readings can now be expressed in terms of time as:

$$T_{delta} = C_{R-T} D_{delta} = C_{R-T} V_{max} T_p \qquad \text{Eq. (15)}.$$

If two consecutive range readings from the same sensor differ by more than $T_{delta}$ they can be rejected as errors. If the difference is less than $T_{delta}$, one must assume that this difference resulted from the vehicle's relative speed, and the readings will not be rejected.

c. The Minimum Interval Constraint

As previously noted, it is desirable to fire any 4 neighboring sensors at intervals of at least 15 ms, to minimize noise saturation due to direct path crosstalk. It is not quite trivial to find optimal timing parameters that meet all three constraints listed above. In the following discussion the reasoning behind the choice of timing parameters that are considered best is explained. Only 12 sensors are considered because this number is sufficient to cover a semi-circular area around the front half of the vehicle and completely protect it from collisions.

Parameter selection begins with determining a period, $T_p$. In the following example one starts out with $T_p = 100$ ms. This period is divided into 4 equal nominal intervals $T_{nom} = 25$ ms, as shown in Table Ia.

TABLE Ia

| | Scheduled firing time for 12 sensors | | | | | | | | | | | |
|---|---|---|---|---|---|---|---|---|---|---|---|---|
| Sensor | 1 | 2 | 3 | 4 | 5 | 6 | 7 | 8 | 9 | 10 | 11 | 12 |
| $T_{lag}$ [ms] | 0 | 25 | 50 | 75 | 0 | 25 | 50 | 75 | 0 | 25 | 50 | 75 |

Next, $T_{delta}$ and couples of $T_{wait,a}$ and $T_{wait,b}$ that meet the Alternating Wait-Times constraint are chosen. One such set is shown in Table Ib. These values were found based on a combination of common sense and trial-and-error. After selecting these values, they were tested in a computer program to verify compliance with Eqs. (13a) and (13b). For the values in Table Ib, Eqs. (13a) and (13b) were met for $T_{delta} \leq 1$ ms. This set of alternating wait-times will be referred to as the "2-ms wait set", because the difference between any two alternating times ($T_{wait,a}$ and $T_{wait,b}$) is 2 ms. Note that with the method of scheduled firing wait-modes (a or b) can be altered at the same time for all sensors. Thus, during the first period $T_{p,a}$ (e.g., $0 < t < 100$ms) $T_{wait,a}$ is in effect for all sensors, and during the following period $T_{p,b}$ (e.g., $100 < t < 100$ms) $T_{wait,b}$ is in effect for all sensors.

With 12 sensors, the largest difference between any two alternating wait-times in a 2-ms wait-set is $2 \times 12 = 24$ms.

TABLE Ib

| | Alternating Wait-Times | | | | | | | | | | | |
|---|---|---|---|---|---|---|---|---|---|---|---|---|
| Sensor | 1 | 2 | 3 | 4 | 5 | 6 | 7 | 8 | 9 | 10 | 11 | 12 |
| $T_{wait,a}$ [ms] | 24 | 24 | 24 | 24 | 24 | 24 | 24 | 24 | 24 | 24 | 24 | 24 |
| $T_{wait,b}$ [ms] | 0 | 2 | 4 | 6 | 8 | 10 | 12 | 14 | 16 | 18 | 20 | 22 |

Scheduled times $T_{lag}$ can now be combined with alternating wait-times $T_{wait}$, to obtain the actual fire schedule listed in Table Ic:

TABLE Ic

| | Actual Fire Schedule | | | | | | | | | | | |
|---|---|---|---|---|---|---|---|---|---|---|---|---|
| Sensor | 1 | 2 | 3 | 4 | 5 | 6 | 7 | 8 | 9 | 10 | 11 | 12 |
| $T_{fire,a}$ [ms] | 24 | 49 | 74 | 99 | 24 | 49 | 74 | 99 | 24 | 49 | 74 | 99 |
| $T_{fire,b}$ [ms] | 0 | 27 | 54 | 81 | 8 | 35 | 62 | 89 | 16 | 43 | 70 | 97 |

One problem with the Actual Firing Schedule in Table Ic is that the recommended 15 ms intervals between firings of any 4 neighboring sensors is not maintained. For example, during the first period sensor #4 is fired at $t = 99$ms. During the following period (which starts at $t = 100$ms) sensor #1 is fired at $T_{fire,b} = 0$ ms (i.e., at $t = 100$ms)—only 1 ms after sensor #4. This problem can be overcome by rearranging wait-time couples as shown in Table Id. This arrangement (found by trial-and-error) is also a 2-ms wait-set. The resulting actual firing schedule is shown in Table Id.

Discussion

Examination of the actual firing schedule shows that the shortest interval between firings of any 4 neighboring sensors is now 19.0 ms (e.g., sensor #4 and sensor #1) and meets the Minimum Interval Constraint.

At this time, the maximum allowable speed $V_{max}$ can be determined from Eq. (15):

TABLE Id

| | Modified Firing Schedule "Schedule-100" | | | | | | | | | | | |
|---|---|---|---|---|---|---|---|---|---|---|---|---|
| Sensor | 1 | 2 | 3 | 4 | 5 | 6 | 7 | 8 | 9 | 10 | 11 | 12 |
| $T_{lag}$ [ms] | 0 | 25 | 50 | 75 | 0 | 25 | 50 | 75 | 0 | 25 | 50 | 75 |
| $T_{wait,a}$ [ms] | 24 | 24 | 24 | 24 | 24 | 24 | 24 | 24 | 24 | 24 | 24 | 24 |
| $T_{wait,b}$ [ms] | 18 | 12 | 6 | 0 | 20 | 14 | 8 | 2 | 22 | 16 | 10 | 4 |
| $T_{fire,a}$ [ms] | 24 | 49 | 74 | 99 | 24 | 49 | 74 | 99 | 24 | 49 | 74 | 99 |
| $T_{fire,b}$ [ms] | 18 | 37 | 56 | 75 | 20 | 39 | 58 | 77 | 22 | 41 | 60 | 79 |

$$V_{max} = \frac{T_{delta}}{C_{R-T} T_p} = \frac{1}{5.9 \times 10^{-3} \times 100} = 1.7 \text{ m/sec} \qquad \text{Eq. (16)}$$

Recall that $V_{max}$ is the maximum speed for which 2 consecutive range measurements to the same object differ by no more than $T_{delta}$.

The properties of the firing schedule Schedule-100 can be summarized as follows.

| Properties of Schedule-100 | |
|---|---|
| Period: | $T_p = 100$ ms; |
| Nominal interval: | $T_{i,nom} = 25$ ms; |
| Shortest actual interval: | $T_{i,min} = 19.0$ ms; |
| Allowable time difference between consecutive readings: | $T_{delta} = 1.0$ ms; |
| Maximum allowable speed: | $V_{max} = 1.7$ m/s. |

ADAPTIVE SCHEDULING

One interesting modification of the above firing schedule is adaptive scheduling. Adaptive scheduling makes use of different firing schedules when operating under different conditions. Different firing schedules can be derived from Schedule-100 (see, Table Id) by proportionally increasing or decreasing values for $T_{lag}$ and $T_{wait}$. For example, Table II shows Schedule-80 which has the following properties:

TABLE II

"Schedule-80"

Schedule-80

TABLE II-continued

"Schedule-80"

Period: $T_p = 80$ ms;
Nominal interval: $T_{i,nom} = 20$ ms;
Shortest actual interval: $T_{i,min} = 15.2$ ms;
Allowable time difference between consecutive readings: $T_{delta} = 0.8$ ms;
Maximum allowable speed: $V_{max} = 1.7$ m/sec.

| Sensor | | 1 | 2 | 3 | 4 | 5 | 6 | 7 | 8 | 9 | 10 | 11 | 12 |
|---|---|---|---|---|---|---|---|---|---|---|---|---|---|
| $T_{lag}$ | [ms] | 0.0 | 20.0 | 40.0 | 60.0 | 0.0 | 20.0 | 40.0 | 60.0 | 0.0 | 20.0 | 40.0 | 60.0 |
| $T_{wait,a}$ | [ms] | 19.2 | 19.2 | 19.2 | 19.2 | 19.2 | 19.2 | 19.2 | 19.2 | 19.2 | 19.2 | 19.2 | 19.2 |
| $T_{wait,b}$ | [ms] | 14.4 | 9.6 | 4.8 | 0.0 | 16.0 | 11.2 | 6.4 | 1.6 | 17.6 | 12.8 | 8.0 | 3.2 |
| $T_{fire,a}$ | [ms] | 19.2 | 39.2 | 59.2 | 79.2 | 19.2 | 39.2 | 59.2 | 79.2 | 19.2 | 39.2 | 59.2 | 79.2 |
| $T_{fire,b}$ | [ms] | 14.4 | 29.6 | 44.8 | 60.0 | 16.0 | 31.2 | 46.4 | 61.6 | 17.6 | 32.8 | 48.0 | 63.2 |

Note that the maximum allowable speed ($V_{max}=1.7$ m/s) is the same for Schedule 80 and Schedule-100; in fact, $V_{max}$ is the same for all Schedules that are derived proportionally from one master Schedule. Thus, one can easily define families of Schedules that differ only in their firing rate (period) and minimum actual interval, $T_{i,min}$. Table III lists the properties of one family of Schedules. The advantages and disadvantages of these different Schedules are discussed below.

TABLE III

Properties of a family of schedules, derived from Schedule-100

| | $T_p$ [ms] | $T_{i,nom}$ [ms] | $T_{i,min}$ [ms] | $T_{delta}$ [ms] | $V_{max}$ [m/sec] |
|---|---|---|---|---|---|
| Schedule-100 | 100 | 25 | 19 | 1.0 | 1.7 |
| Schedule-90 | 90 | 22.5 | 17.0 | 0.9 | 1.7 |
| Schedule-80 | 80 | 20 | 15.2 | 0.8 | 1.7 |
| Schedule-70 | 70 | 17.5 | 13.5 | 0.7 | 1.7 |
| Schedule-60 | 70 | 15.0 | 11.4 | 0.6 | 1.7 |
| Schedule-50 | 60 | 12.5 | 9.5 | 0.5 | 1.7 |
| Schedule-40 | 50 | 10.0 | 7.6 | 0.4 | 1.7 |

As previously stated, it is desirable to have a minimum actual interval of $T_{i,min} > 15$ ms, to avoid noise saturation in the very close proximity to walls (because of double-echoes). If $T_{i,min}$ is very small, then much noise will be generated and the present inventive will have to reject most readings. For example, rejection rates of 90% or more have been observed with Schedule-40 (where $T_{i,min}=7.6$ ms). Obviously, with only 10% of all readings accepted, fast sampling is self-defeating since many more useful readings could be obtained by sampling slower, with a lower rejection rate. Noise-saturation is not a problem when the vehicle is operating away from reflective objects. Moreover, fast sampling is desirable when traveling at high speed, but is less important at low speeds.

These observations can be used to implement desirable driving behavior: In the absence of near-by obstacles, the vehicle can travel fast, whereas in the presence of obstacles the speed should be reduced. Thus, the following adaptive firing method can be implemented: initially, the present system uses a fast firing schedule, for example Schedule-40. Monitoring the rejection rate (which would rise in the near-by presence of crosstalk-promoting objects), the algorithm progressively reduces the firing rate by invoking a slower firing schedules. At the same time, this system communicates with the vehicle controller and forces a reduction in speed, as appropriate for the now slower sampling rate of the sensors.

This implementation of adaptive firing is ideally suited to the operation of multiple robots in the same environment. Consider, for example, robot A firing at the rate of Schedule-50. As another robot (robot B) approaches, both robots mutually induce noise and therefore experience an increase in their rejection rates (provided, they both operate with the present inventive system). With adaptive firing, both robots will reduce their firing rate and thereby cause less mutual disturbance.

This behavior is analogous to highway driving at night. At high speed, the driver switches the headlights to "high" (analogous to a high firing rate). However, if another car approaches from the opposite direction, both drivers turn their headlights "low" (low firing rate) in order to minimize the mutual disturbance. This way, both drivers can proceed safely, albeit at reduced speed.

OTHER PARAMETERS

All of the Schedules are designed for the same maximum speed of $V_{max}=1.7$ m/sec. For this speed, it is assumed that a maximum look-ahead range (for the front-facing sensors) of $R_{max}=3.4$ m is sufficient. $T_{wind}$, the time a sensor will wait for an echo, is immediately determined from the specification of $R_{max}$; namely, $T_{wind}=C_{R-T}R_{max}=20$ ms. Further optimization can be achieved by choosing a correspondingly shorter $T_{wind}$ for side-facing sensors, to reduce the chances for erroneous readings due to random noise.

RANDOM NOISE

Errors due to random noise cannot be fully eliminated by this method, but can be minimized, as the following discussion shows. It is assumed that random noise can cause erroneous readings anywhere between the minimum and maximum range of the sensor ($R_{min}=0.3$ to $R_{max}=3.4$ m, in the numeric example here).

The probability of any reading being caused by random noise is denoted as $p_{noise}$. The probability for an arbitrary reading to fall between $R_{last}$ and ($R_{last}-R_{delta}$) is:

$$P_{diff} = \frac{T_{delta}/C_{R-T}}{R_{max} - R_{min}} = \frac{0.5 \times 10^{-3}/5.9 \times 10^{-3}}{3.4 - 0.3} \approx 0.027 \quad \text{Eq. (17)}$$

Where $T_{delta}$ is chosen from Schedule-60, as an example.

Thus, the upper limit for the probability for a reading to be caused by noise and be less than $T_{delta}$ below the previous reading is $P_{noise} = P_{diff} \, p_{noise}$. Note that $P_{noise}$ increases proportionally for Schedules with larger $T_{delta}$. The practical interpretation of Eq. (17) is that the present rapid firing system does not completely reject all occurrences of external random noise. Rather, there is a probability of $P_{diff}$ that a random noise signal is not rejected. For the numeric example above, one out of every $1/0.027 = 37$ noise signals will not be rejected. This number is proportionally larger for larger $T_{delta}$.

OMNIDIRECTIONAL VEHICLES

In the foregoing discussion firing schedules for 12 sensors have been discussed. This is a number that is sufficient to protect the robot from collisions. However, omnidirectional mobile robots have ring-type sensor arrangements, where the chassis (and the sensor ring) do not rotate when the robot changes its direction of motion. Rather, any sensor may be a forward-facing sensor at any time. To accommodate this design in the present embodiment of the invention the main on-board computer must periodically (e.g., once during every period) provide data concerning the robot's direction of travel to the processor which is executing the algorithm of the present invention. The inventive algorithm then computes a pointer that points to sensor #1 out of a set of 12 sensors that are facing forward, with respect to the momentary direction of travel. Then, subsequent firings are performed according to the current Schedule and relative to the pointer.

Three methods for firing multiple ultrasonic sensors are disclosed herein. These include: (1) immediate asynchronous re-firing, (2) scheduled synchronous firing, and (3) scheduled asynchronous firing. There have additionally been disclosed herein two methods for identifying and rejecting erroneous readings. These methods include: (1) Comparison of consecutive readings and (2) comparison of consecutive readings with alternating wait-states. The combination of firing methods with rejection methods yields six methods for operating ultrasonic sensors. Each one of these methods allows faster, more reliable operation than conventional methods.

Of these six combinations, the one that yielded the best performance under test is Scheduled asynchronous firing with alternating wait-states. This method, denominated as Method 3 in this disclosure, can be enhanced by including therewith the method of adaptive scheduling. Adaptive scheduling, as previously indicated, monitors the rate at which readings are rejected. A high rejection rate points to the presence of crosstalk-promoting objects or to the presence of other mobile robots. Adaptive scheduling responds to either case by reducing the firing rate, and, simultaneously, the travel speed of the vehicle. Experimental results show successful rejection of both direct and indirect path crosstalk (from on-board sensors).

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of operating a sensor element of the type which issues and receives acoustical energy to produce data corresponding to the presence of an article, the method comprising the steps of:

triggering the sensor element to issue a first pulse of the acoustical energy;

first receiving an acoustical energy at the sensor element;

first retriggering the sensor element to issue a second pulse of the acoustical energy upon expiration of a first predetermined period of time after said step of first receiving;

second receiving an acoustical energy at the sensor element;

second retriggering the sensor element to issue a pulse of the acoustical energy upon expiration of a second predetermined period of time after said step of second receiving;

comparing the duration of a first interval between said steps of triggering and first receiving, and the duration of a second interval between said steps of first retriggering and second receiving; and rejecting data as erroneous in response to a difference between said step of comparing.

2. The method of claim 1 wherein said first and second predetermined periods of time are of unequal durations.

3. The method of claim 2 wherein after said step of second retriggering, said steps of first receiving, first retriggering, second receiving, and second retriggering are repeated, whereby said first and second predetermined periods of time are alternated.

4. The method of claim 1 wherein there are provided a plurality of sensors configured as a group of sensors, said group of sensors having a predetermined number of said sensors, said step of triggering occurring sequentially in time for each member of the group, in accordance with a predetermined triggering schedule wherein said first and second predetermined periods of time are alternated.

5. The method of claim 4 wherein there is further provided a plurality of groups of said sensors.

6. The method of claim 1 wherein said step of rejecting data as erroneous is responsive to a difference between said first and second intervals being greater than a predetermined period of time.

7. The method of claim 1 wherein there is further provided the step of controlling a period of time between said steps of first and second retriggering in response to a rate of rejecting data as erroneous.

8. A method of operating an array of ultrasonic sensor elements of the type which issue and receive ultrasonic energy to produce navigation data for a vehicle, the navigation data being responsive to the presence of an article, the method comprising the steps of:

defining the array of ultrasonic sensor elements as a plurality of groups of plural ultrasonic sensor elements;

triggering a first ultrasonic sensor in each of the groups of ultrasonic sensor elements, to issue a respective first pulse of the ultrasonic energy;

first receiving ultrasonic energy at the first ultrasonic sensor element of each group;

first retriggering the first ultrasonic sensor element to issue a second pulse of the energy after expiration of a retriggering period of time for the first ultrasonic sensor element having a duration corresponding to a combined predetermined firing cycle period and a first predetermined period of wait-time;

triggering a second ultrasonic sensor element in each of the groups of ultrasonic sensor elements, to issue a respective first pulse of the ultrasonic energy after expiration of a predetermined associated schedule period, said predetermined schedule period having a duration which is less than that of said predetermined firing cycle period;

first receiving ultrasonic energy at the second ultrasonic sensor element of each group; and first retriggering the second ultrasonic sensor element in each group to issue a respective second pulse of the energy after expiration of a retriggering period of time for the second ultrasonic sensor element having a duration corresponding to the combination of the predetermined firing cycle period, a further predetermined associated schedule period, and a first predetermined period of wait-time.

9. The method of claim 8 wherein there are further provided the steps of:

second receiving ultrasonic energy at each first ultrasonic sensor element; and second retriggering the first ultrasonic sensor element to issue a pulse of the energy upon expiration of a second predetermined period of wait-time after said step of second receiving.

10. The method of claim 8 wherein said first and second predetermined periods of wait-time are of unequal durations.

11. The method of claim 10 wherein after said step of second retriggering, said steps of first receiving, first retriggering, second receiving, and second retriggering are repeated during subsequent firing cycle periods, whereby said first and second predetermined periods of wait-time are alternated.

12. A method of operating an array of ultrasonic sensor elements of the type which issue and receive ultrasonic energy to produce navigation data for a vehicle, the navigation data being responsive to the presence of an article, the method comprising the steps of:

defining the array of ultrasonic sensor elements as a plurality of groups of plural ultrasonic sensor elements;

first triggering simultaneously each ultrasonic sensor element in a first group of the ultrasonic sensor elements, to issue a respective first pulse of the ultrasonic energy for each ultrasonic sensor element therein;

first triggering simultaneously each ultrasonic sensor element in a second group of ultrasonic sensor elements, to issue a respective first pulse of the ultrasonic energy for each ultrasonic sensor element therein after expiration of a schedule period from the time of first triggering the first group of the ultrasonic sensor elements and upon further expiration of a first predetermined period of wait-time;

first retriggering simultaneously the ultrasonic sensor elements in the first group of ultrasonic sensor elements to issue a second pulse of the energy after expiration of a retriggering period of time for the ultrasonic sensor elements in the first group having a duration corresponding to a combined predetermined firing cycle period and a predetermined period of wait-time; and first retriggering simultaneously the ultrasonic sensor elements in the second group of ultrasonic sensor elements, to issue a second pulse of the ultrasonic energy after expiration of a retriggering period of time for the ultrasonic sensor elements in the second group having a duration corresponding to the combination of the predetermined firing cycle period and a predetermined associated schedule period, said predetermined schedule period having a duration which is less than that of the predetermined firing cycle period.

13. The method of claim 12 wherein said predetermined period of wait-time has a first duration during every other predetermined firing cycle period, and a second duration the remaining predetermined firing cycle periods.

* * * * *